Patented June 3, 1930

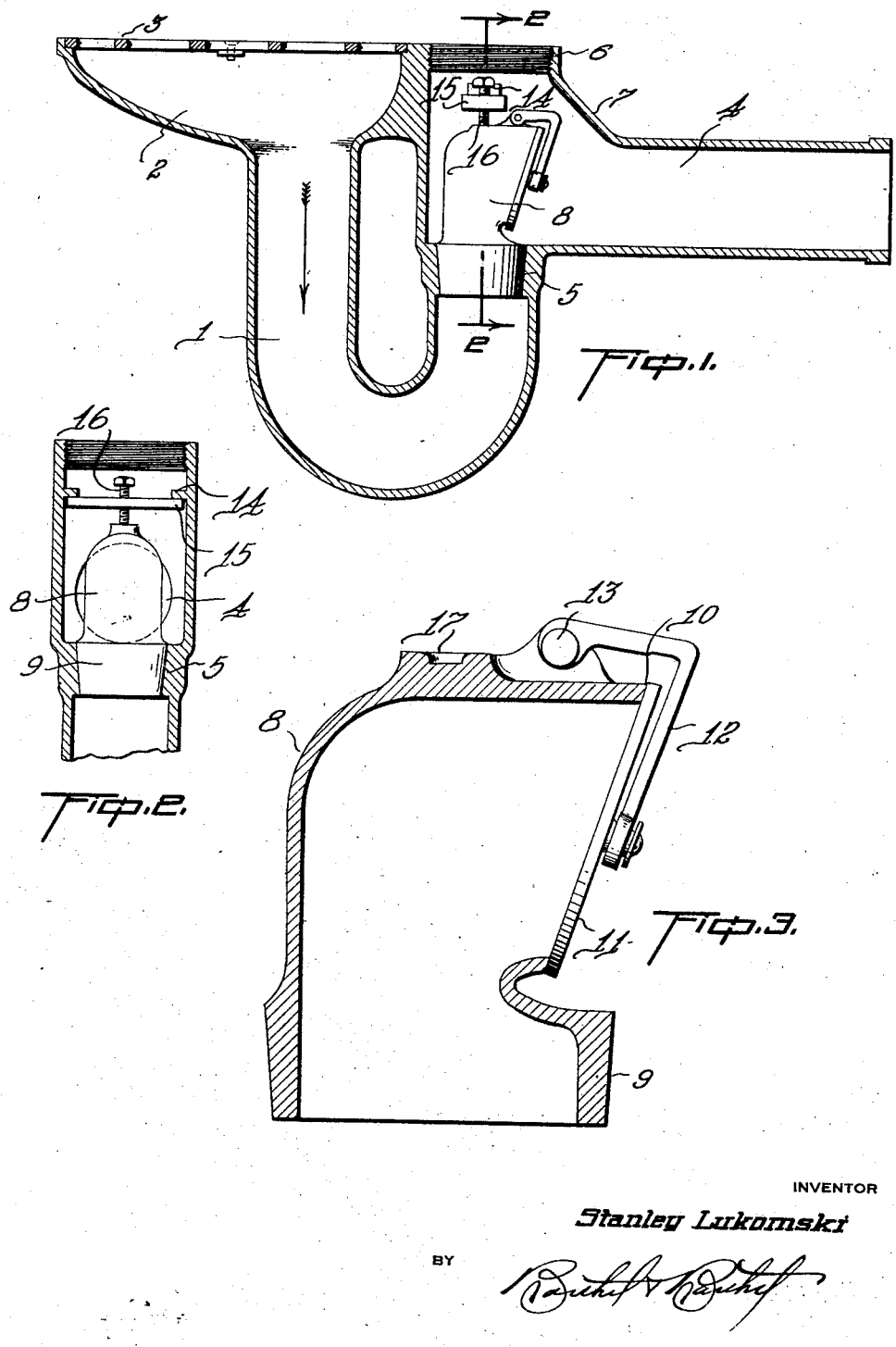

1,761,217

UNITED STATES PATENT OFFICE

STANLEY LUKOMSKI, OF DETROIT, MICHIGAN

BACK-WATER TRAP

Application filed November 17, 1928. Serial No. 320,044.

The present invention pertains to a novel back water trap adapted for insertion between a sewer main and an outlet pipe leading therein from a building or the like. The trap is usually placed at a comparatively low level and prevents back flow through the outlet pipe and piping system discharging thereinto, in the event that the sewer main becomes flooded.

A trap of this character usually includes a main body or U-shaped member into which is threaded a separate check valve body permitting flow in only one direction. It is desirable at intervals to remove the check valve body for the purpose of cleaning the same, but in practice the threaded connection between it and the main body becomes rusted and corroded so that it is practically impossible to remove the check valve body.

The principal object of the present invention is to provide a construction of this character wherein the check valve body may be easily removed. This object is accomplished essentially by forming the main body with an internal conical seat and forming the check valve body with an outer conical portion adapted to fit into the seat. Over the check valve body is a suitable device for holding this body firmly upon its seat against the force of the incoming fluid.

The invention is fully disclosed by way of example in the following description and in the accompanying drawing, in which—

Figure 1 is a longitudinal section of the trap showing in elevation the check valve body;

Fig. 2 is a vertical section on the line 2—2 of Figure 1; and

Fig. 3 is a vertical section of the check valve body.

Reference to these views will now be made by use of like characters which are employed to designate corresponding parts throughout.

The main body of the trap comprises as usual a U-shaped conduit 1 at one end of which is an inlet bore or basin 2 covered by a detachable grating 3. From the other side extends a straight branch 4 adapted to be coupled to a sewer main, while the grating 3 is normally set in a floor to drain the same.

The conduit 1 is formed with a valve seat 5 near the base of the branch 4, and this seat is preferably of conical formation tapering downwardly. Directly above the valve seat, and at some distance therefrom, is a threaded bore 6 disposed between the grating 3 and a riser 7 extending upwardly from the branch 4.

The valve seat 5 is adapted to support a right angular check valve body 8 having its lower edge formed exteriorly with a conical wall 9 adapted to fit into the seat 5. The remaining end of this valve body is sloped downwardly as at 10 and equipped with a closure disk 11 supported by an angular arm 12 which is pivoted as at 13 to the top of the body 8.

For the purpose of holding the check valve body 8 on its seat against fluid flowing upwardly into the tapered end 9 thereof, there is provided a clamping device including a pair of lugs 14 formed on the inner wall of the main body 1 directly beneath the threaded bore 6. Beneath these lugs is placed a transverse bar 15 through which is passed a screw 16. The lower end of the screw rests in a seat 17 formed on the top of the valve body 8. It will be apparent that as the screw is threaded into the bar 15, the latter will be drawn upwardly against the lugs 14 and the valve body 8 will be pressed down against its seat.

Back flow from the branch 4 into the main body 1 is prevented by the disk 11 which normally closes against the upper end 10 of the inner valve body 8. When it is desired to clean this valve body, the screw 16 is merely loosened, whereupon the bar 15 may be withdrawn and the check valve body 8 then lifted off its seat. The threaded bore 6 is preferably equipped with a suitable screw plug which obviously must be removed prior to any removal of the check valve body 8.

Although a specific embodiment of the invention has been illustrated and described, it will be understood that various alterations in the details of construction may be made without departing from the scope of the invention as indicated by the appended claims.

What I claim is:—

1. A back water trap comprising a body adapted to convey fluid and having a seat formed in the passage thereof, a check valve body fitted in said seat, a pair of lugs formed on the inner walls of said first named body above said seat, a bar engageable beneath said lugs, and a screw threaded through said bar and adapted to bear upon said check valve body.

2. A back water trap comprising a body adapted to convey fluid and having a conical seat formed in the passage thereof, a check valve body fitted in said seat, a pair of lugs formed on the inner walls of said first named body above said seat, a bar engageable beneath said lugs, and a screw threaded through said bar and adapted to bear upon said check valve body.

In testimony whereof I affix my signature.

STANLEY LUKOMSKI.